United States Patent [19]

Catterall

[11] 3,883,698

[45] May 13, 1975

[54] ARRANGEMENT FOR HANDLING PERMANENT SIGNALS

[75] Inventor: John Mason Catterall, Columbus, Ohio

[73] Assignee: Bell Telephone Laboratories, Incorporated, Murray Hill, N.J.

[22] Filed: Jan. 10, 1974

[21] Appl. No.: 432,289

[52] U.S. Cl. .............................. 179/18 F; 179/18 G

[51] Int. Cl. .............................................. H04m 3/14

[58] Field of Search ............. 179/18 F, 175, 175.24, 179/175.25, 17 B, 19, 18 G, 186

[56] References Cited

UNITED STATES PATENTS 2,826,640 3/1958 Williford .............................. 179/22

*Primary Examiner*—William C. Cooper
*Assistant Examiner*—C. T. Bartz
*Attorney, Agent, or Firm*—C. H. Davis

[57] ABSTRACT

A multistage switching network is disclosed with lines terminated on the first stage, conventional permanent signal trunks terminated on the last stage and overflow permanent signal trunks terminated on links which interconnect the first and last stages. In response to a permanent signal condition on a line, common control apparatus tests the line to ascertain whether the permanent signal was caused by a trouble condition or a receiver off-hook. Based on this test the line is connected to the appropriate trunk.

10 Claims, 10 Drawing Figures

ARRANGEMENT FOR HANDLING PERMANENT SIGNALS

FIELD OF THE INVENTION

A permanent signal occurs in a telephone switching system when a calling customer initiates a telephone call and neglects to dial the number of the called party within a prescribed interval. Permanent signals also result from false service requests caused by trouble conditions on customer lines as a consequence of cable failures and the like.

This invention relates to telephone switching systems and more particularly to improved arrangements for treating permanent signal conditions in telephone switching systems.

BACKGROUND OF THE INVENTION

When a service request signal is received from a customer line, the telephone switching system responds by connecting dial tone register apparatus to the line to receive the called number information as it is transmitted from the calling station. This apparatus is usually equipped with timing circuitry to measure the interval before the first digit is received and the interval between digits. If no digits are received from the calling station within a prescribed interval, it is assumed that the call is a permanent signal. The line is then either locked out or connected to a special trunk circuit to prevent further recognition of the false service request signals.

In either event a special permanent signal tone is returned over the line to inform the customer that the line is in a permanent signal condition. If the permanent signal condition was caused by the receiver being inadvertently left off-hook, the customer must restore the line to normal before attempting to place another call.

One typical prior art arrangement for handling permanent signals involves the use of permanent signal holding trunks which are connected to the trunk side of a switching network. Upon recognizing a permanent signal, the control circuitry establishes a network connection to the permanent signal holding trunk which returns permanent signal tone to the calling customer. These permanent signal holding trunks are generally accessible by an operator who can ascertain whether the permanent signal was caused by a receiver off-hook or a trouble condition on the line.

In the event of a large number of permanent signals, such as might result from a cable failure, the permanent signal holding trunks become congested and permanent signal calls are routed to a trunk group having combined tone trunks. These trunks are equipped to return either permanent signal or reorder tone, depending on the needs of the system, and the combined tone trunks generally are accessible for testing from a local test desk.

Under extreme permanent signal conditions, when no permanent signal holding or tone trunks are available, certain switching systems are arranged so that the dial tone registers which receive the dialed information from the calling station can be set to return reorder tone to the calling station.

While these systems are entirely adequate for their intended purpose, they have certain deficiencies which have been overcome with the proposed arrangement.

For example, as more and more trunks are required to handle permanent signal traffic, the effective capacity of the network terminations for other trunks is greatly reduced. Furthermore, if the registers are called upon to return reorder tone on permanent signal calls, these registers cannot be used for their normal function and dial tone delays are experienced.

It is therefore one object of the invention to provide an increased number of permanent signal circuits in a switching system without decreasing the number of trunk terminations.

Instead of providing trunks capable of returning permanent signal tone, some systems have line lock-out circuitry which disables the calling line circuit in the event the permanent signal is detected. While this arrangement does not utilize trunk network appearances, and does not needlessly tie up dial tone register equipment, it must be realized that every line circuit must be equipped with lock-out circuitry while only a small percentage of the lines may experience permanent signal conditions at any one time.

Prior art systems are generally equipped to handle all permanent signals in the same manner and treatment may vary depending upon the number of permanent signals existing simultaneously. Thus, a warning alarm may be actuated when a predetermined number of permanent signals exist to inform a maintenance force of a possible cable failure. All the lines in a permanent signal condition must then be tested to ascertain which permanent signals were caused by trouble and which were caused merely by receivers being inadvertently left off-hook. It can readily be appreciated that false alarms may occur due to many receivers being off-hook coincidentally. Furthermore, maintenance personnel will needlessly waste time while looking for only those lines which may actually be in trouble.

Accordingly, it is another object of the invention to automatically ascertain the nature of the permanent signal condition so that permanent signals of different types may be treated differently to facilitate maintenance.

SUMMARY OF THE INVENTION

These and other objects are attained in the one illustrative embodiment of the invention wherein a multistage switching network is equipped with permanent signal and tone trunks connected to an end stage of the network and overflow trunks are coupled to intermediate links which interconnect the switching stages.

The specific embodiment of the invention disclosed herein comprises a four-stage switching network. The first stage comprises line switches on which customer lines appear. The last stage comprises trunk switches for terminating dial tone registers and various kinds of trunk circuits, and the two intermediate stages comprise junctor switches for providing full access between the line and trunk switches.

The switches in different stages of the network are interconnected by junctors and links which are coupled together to form a transmission channel through the network. The last two stages are connected by so-called "trunk links." Permanent signal holding trunks and other trunks are connected to the trunk terminations on the trunk switches in a conventional manner. To provide additional facilities for permanent signals, overflow trunks are coupled directly to the trunk links between the trunk and junctor switches.

Connections are established in the system by common control circuitry including a marker, and the marker is equipped to ascertain the nature of the permanent signal. More specifically, in response to the permanent signal, the marker is arranged to establish a transmission path from a dummy trunk appearance to the line having the permanent signal. The marker then ascertains if the permanent signal condition was caused by a receiver off-hook or trouble on the line. The marker can route all trouble permanent signals to one trunk group while routing the receiver off-hook permanent signals to another trunk group. The trunks in these various groups are terminated on the trunk switches and the marker uses its trunk test circuitry to select an idle trunk.

In the event the marker cannot select an idle permanent signal trunk on a trunk switch, the marker route advances to select an overflow trunk. Under these circumstances, the trunk selection circuitry in the marker is disabled and the marker proceeds as though it had selected an idle trunk. The marker then uses its channel test circuitry to select an idle channel through the network and the overflow circuitry coupled to the channel is actuated to return tone to the line having a permanent signal. Thus, by using an intermediate stage of the network, permanent signal tone can be returned to the customer line without utilizing additional trunk terminations.

BRIEF DESCRIPTION OF THE DRAWING

A better understanding of the arrangement contemplated will be had with the following description made with reference to the drawing in which:

More specifically, FIG. 2 shows a portion of a line link frame while FIGS. 3, 4, and 5 show a portion of a trunk line frame.

FIGS. 6–9 show a portion of a marker circuit with FIG. 6 showing the channel test circuitry, FIG. 8 showing the continuity and ground test circuitry, FIG. 9 showing the trunk busy test circuitry and the other control logic being shown in FIG. 7.

BRIEF DESCRIPTION OF THE ARRANGEMENT

Figure 1:
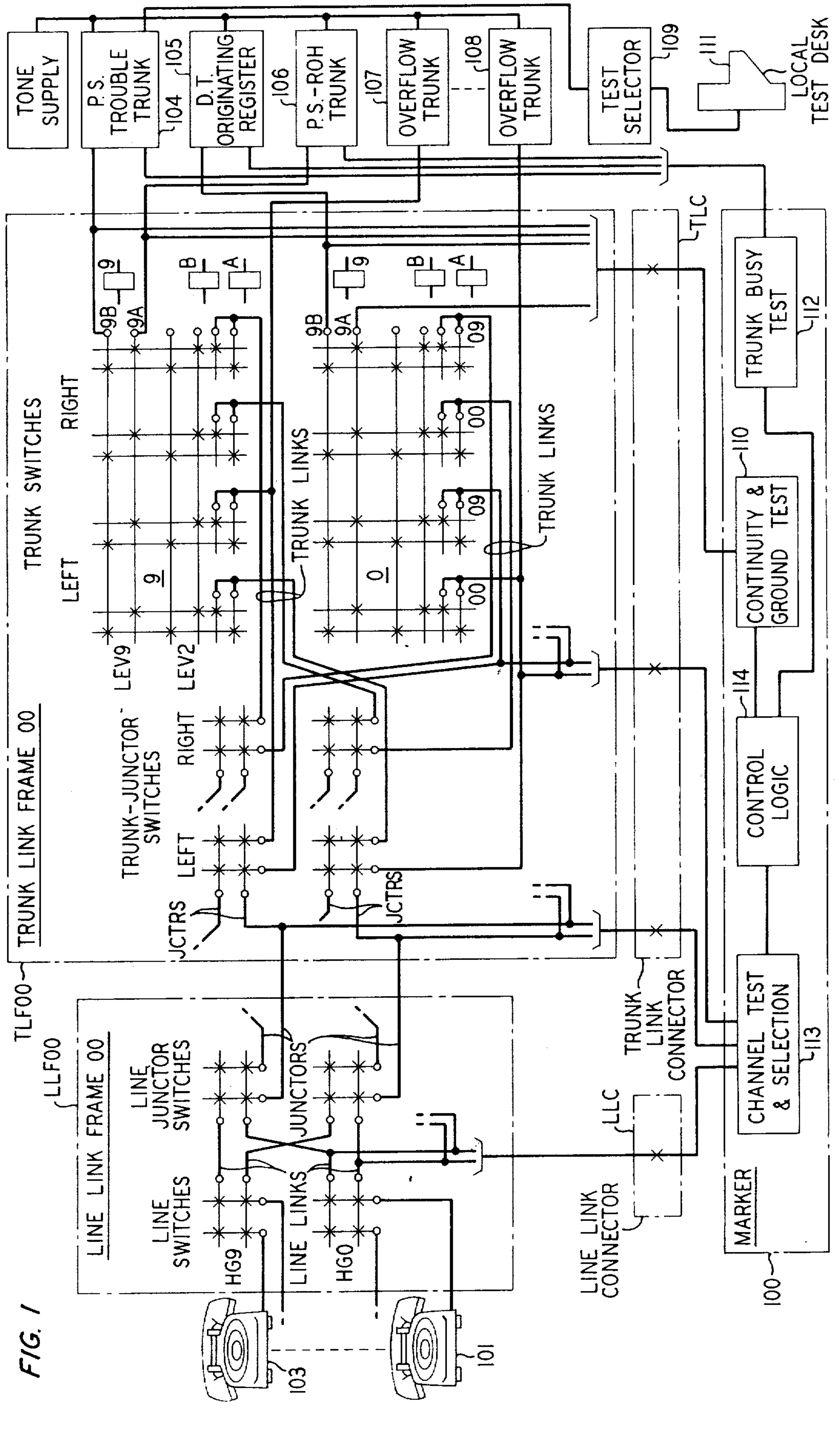
FIG. 1 shows a block diagram of a telephone switching system utilizing the invention.

FIG. 1 contains a symbolic representation of a specific illustrative embodiment of the invention employed in a crossbar telephone system similar to the type more fully described in U.S. Pat. No. 2,585,904, issued to A. J. Busch, on Feb. 19, 1952. It will be recalled that the Busch patent discloses a crossbar telephone switching system employing markers such as 100, line-link frames such as LLFOO, trunk-link frames such as TLFOO, and other common control equipment not shown.

Each line-link frame includes crossbar switches arranged in ten horizontal groups designated HGO to HG9. Each horizontal group contains a line junctor switch and at least one line switch. The verticals of the line switches are connected to subscribers lines such as 101–103, while the horizontals are connected via line links to the line junctor switches. The line links are arranged so that there is one line link connecting each line switch with each line junctor switch. If traffic conditions permit, additional line switches may be added to the existing line switches by connecting their horizontals in multiples throughout.

Each trunk link frame has ten trunk switches and ten trunk junctor switches, each being divided into right and left halves. The verticals on the left halves of the trunk junctor switches are connected via trunk links to the verticals on the left halves of the trunk switches. Similarly, the right-half junctor switches are connected via trunk lines to the right-half trunk switches. These trunk links are arranged so that each trunk switch has access to each trunk junctor switch.

There are two three-wire trunks connected to each of the horizontals, or levels 2 through 9, of each of the trunk switches. For instance, permanent signal holding trunk 104 is connected to level 9B on trunk switch 9 of trunk link frame TLFOO, and it will readily be seen that another trunk, such as 106, can be accommodated on level 9A of the same switch. The two appearances on each of levels 2–9 are obtained by using a six-wire crossbar switch and operating the select magnets A or B at the 0 or 1 level in addition to the select magnet at the level, such as select magnet 9, on which trunk 104 appears. The A or B select magnet controls the crosspoints which connect the trunk link to one or the other of two vertical multiples, thereby obtaining sixteen three-wire trunk appearances for each trunk switch.

The trunk junctor switches are split vertically and the horizontals of the left half are connected via junctors to the verticals on the even-numbered line link frames, while the horizontals on the right half are connected via junctors to the verticals on the odd-numbered line link frames.

All switching operations are under control of a marker, such as 100, which has access to line link frames via line link connector LLC. The marker also has access to trunk link frames such as TLFOO via a trunk link connector TLC.

As mentioned above, all conventional trunk circuits are connected to the horizontal terminals of the last stage of the network, that is the trunk switches, and a connection is established between a customer line and a conventional trunk over a three-wire transmission path called a channel comprising a line link, a junctor and a trunk link.

In accordance with a feature of the invention, additional circuits for serving permanent signals are connected to the intermediate links of the network. In the illustrative embodient, overflow trunks 107 and 108 are connected to the trunk lines. Thus, a permanent signal condition on a line can be served by an overflow trunk without utilizing any of the trunk terminations.

To illustrate the operation of the arrangement, let it be assumed that the customer at station 101 has inadvertently left his receiver off-hook, causing a permanent signal condition on his line. When the receiver at station 101 is initially removed, a service request signal is sent to the marker. The marker selects an idle dial tone originating register such as 105 which is connected to a trunk terminal on a trunk link frame, and a channel connection is established using a line link, a junctor and a trunk link to interconnect station 101 with originating register 105.

Originating register 105 returns dial tone to the calling customer station and if the customer does not proceed to dial the called number within a specified time interval, the register recognizes this as a permanent signal and summons marker 100.

In accordance with another feature of the invention, marker 100 selects a dummy trunk appearance such as 9A on switch 0 of trunk link frame TLFOO and the marker establishes a three-wire channel over the network from the dummy trunk appearance to customer station 101. The marker contains continuity and ground test circuitry 110, which is selectively connected to the dummy trunk appearance to test the customer line associated with station 101 and thereby ascertain the nature of the permanent signal condition. As per this feature of the invention, the marker can ascertain if the permanent signal has been caused by a trouble condition or if the customer has inadvertently left his receiver off-hook.

Once the cause of the permanent signal condition has been ascertained, the marker can then select the appropriate trunk group so that all permanent signals of the same type are connected to the same trunk group. For example, if the permanent signal has been caused by a trouble condition on the line, marker 100 might connect the line to permanent signal trouble trunk 104. It should be noted that permanent signal trouble trunk 104 may be of the aforementioned combined tone type that can be accessed from local test desk 111 via test selector 109. Thus, the maintenance personnel at local test desk 111 can establish a test connection to the faulty line via the permanent signal trouble trunk. In this manner, the test desk can monitor the trouble, dispatch a repairman and assist the repairman in locating the trouble condition.

If, on the other hand, the permanent signal is merely a receiver off-hook condition, the marker might route the call directly to a trunk such as 106 to return appropriate tone to the calling customer. Trunks such as 106 may be of the aforementioned permanent signal holding type to permit operator monitoring of the line, or of the combined tone type to permit access via the test selector 109.

Thus, by using the continuity and ground test circuitry 110, marker 100 can ascertain the cause of the permanent signal and route the call to the appropriate trunk group. The routing, of course, could be different from that described above depending on the needs of the particular system.

Once the marker has selected a trunk group for routing the permanent signal call, the marker uses trunk busy test circuit 112 to select an idle trunk in the selected trunk group. Having selected an idle trunk, the marker now selects an idle transmission channel to interconnect the permanent signal line with the selected trunk. A channel comprises a line link, a junctor and a trunk link, and channel test and selection circuitry 113 in the marker is connected to the appropriate channel components to select these matching components that are idle. Once an idle channel has been selected, a line serving station 101 is connected over the channel to the selected trunk.

In the example being described, station 101 is connected to a permanent signal receiver-off-hook trunk 106. Trunk 106 will return tone to the customer at station 101 and when the customer restores his receiver, the connection to trunk 106 will release, restoring the customer line to normal.

The telephone system being described herein is capable of selecting alternate trunk groups if all trunks in the first choice group are busy. The marker can, therefore, route advance from trunk group to trunk group until an idle trunk group is found.

If all trunks utilized for permanent signal traffic were to be terminated on the horizontals of the trunk switches, there would be less terminations available for regular service trunks.

In accordance with another feature of the invention, overflow trunk circuits such as 107 and 108 are connected to the trunk links which interconnect the last two stages of the switching network.

It will now be assumed that marker 100 has examined the trunk group including trunk 106 and was unable to find an idle trunk for the receiver-off-hook permanent signal caused at station 101. The control logic 114 in the marker then causes the marker to route advance to the overflow trunk circuits. This is accomplished by disabling the trunk busy test circuitry 112 and forcing the marker to skip its conventional trunk test and selection functions. The marker then proceeds to select an idle channel using channel test and selection circuitry 113 in a manner similar to that described above. A channel having a trunk link that is equipped to return overflow tone is selected and the calling station 101 is coupled over the channel to the overflow trunk circuit. The overflow trunk circuit is arranged to hold the connection similar to a conventional trunk and the connection will be released when the receiver at station 101 is replaced on-hook.

DETAILED DESCRIPTION

Figure 2:
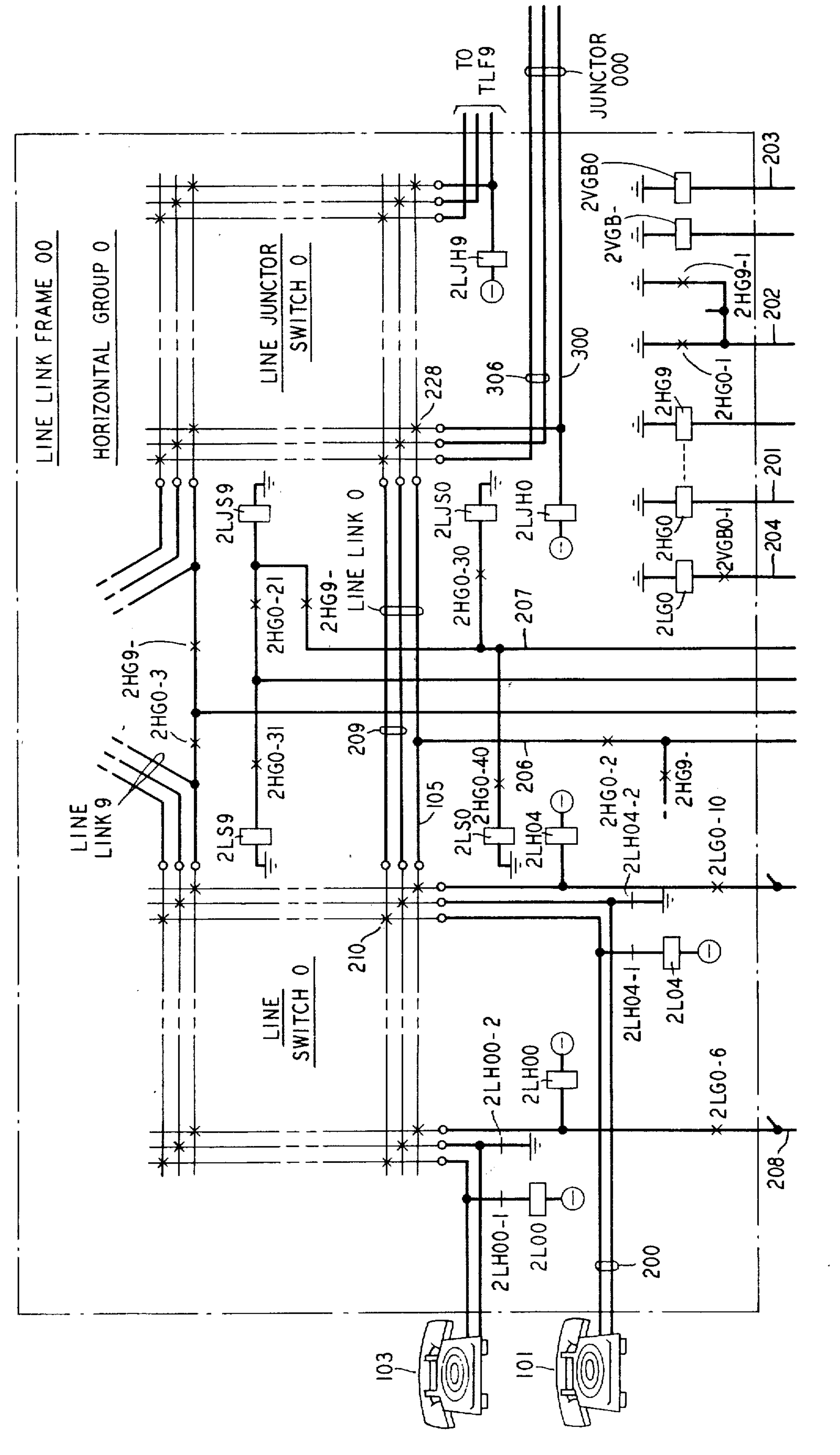
FIGS. 2–9 when arranged according to FIG. 10 show a more detailed schematic diagram of a portion of the same telephone switching system shown in FIG. 1.
Figure 3:
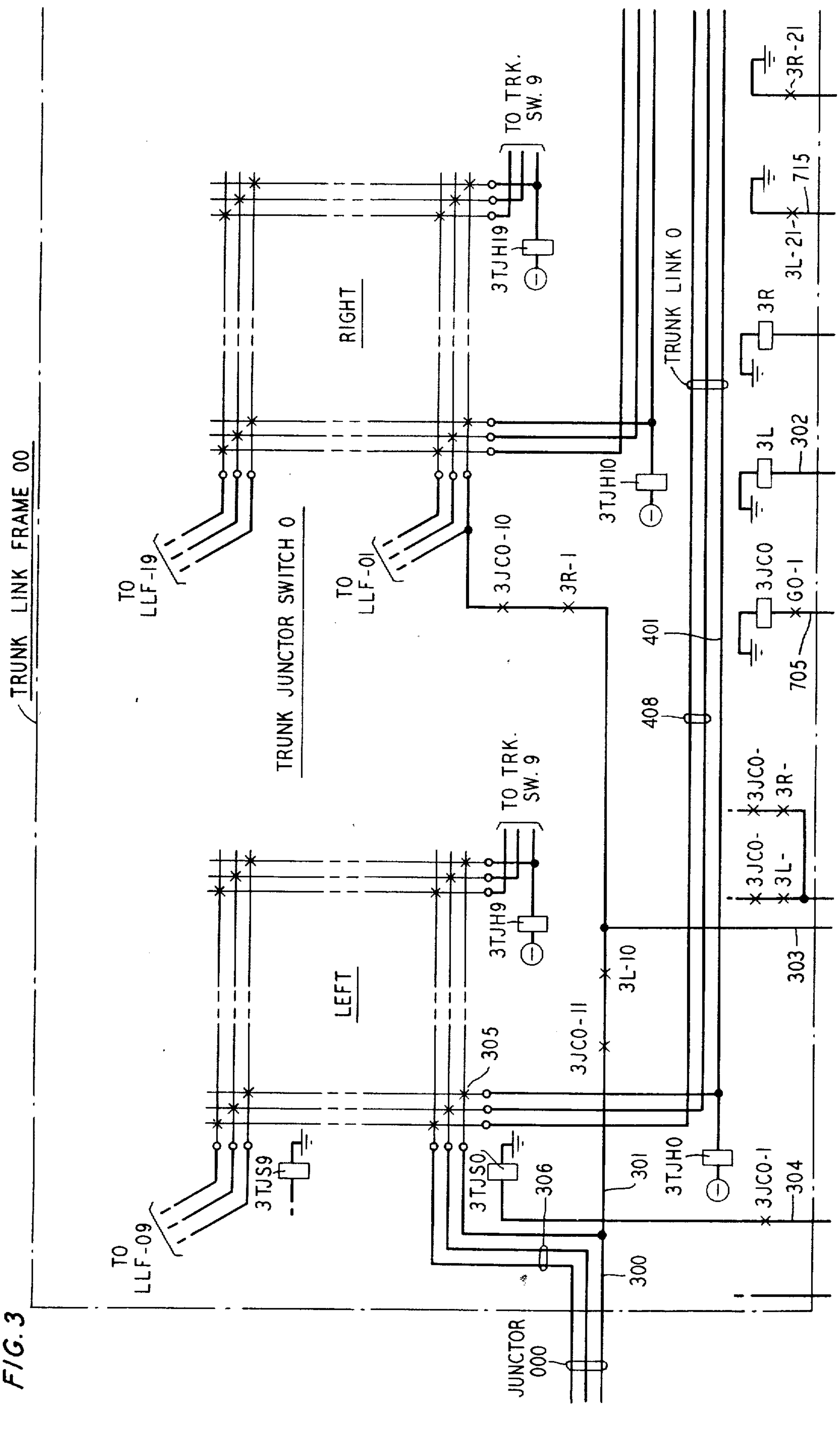
Figure 4:
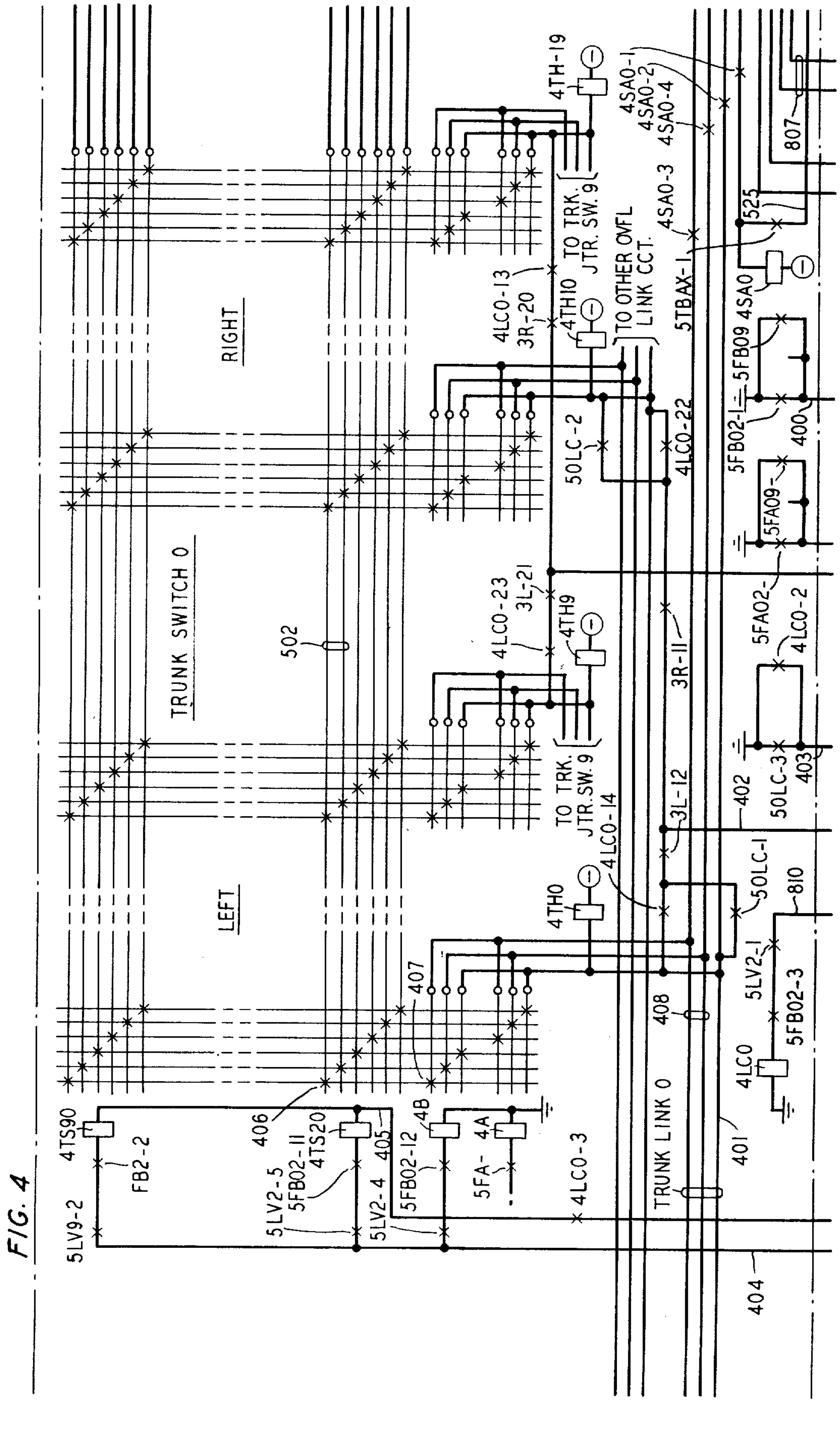
Figure 5:
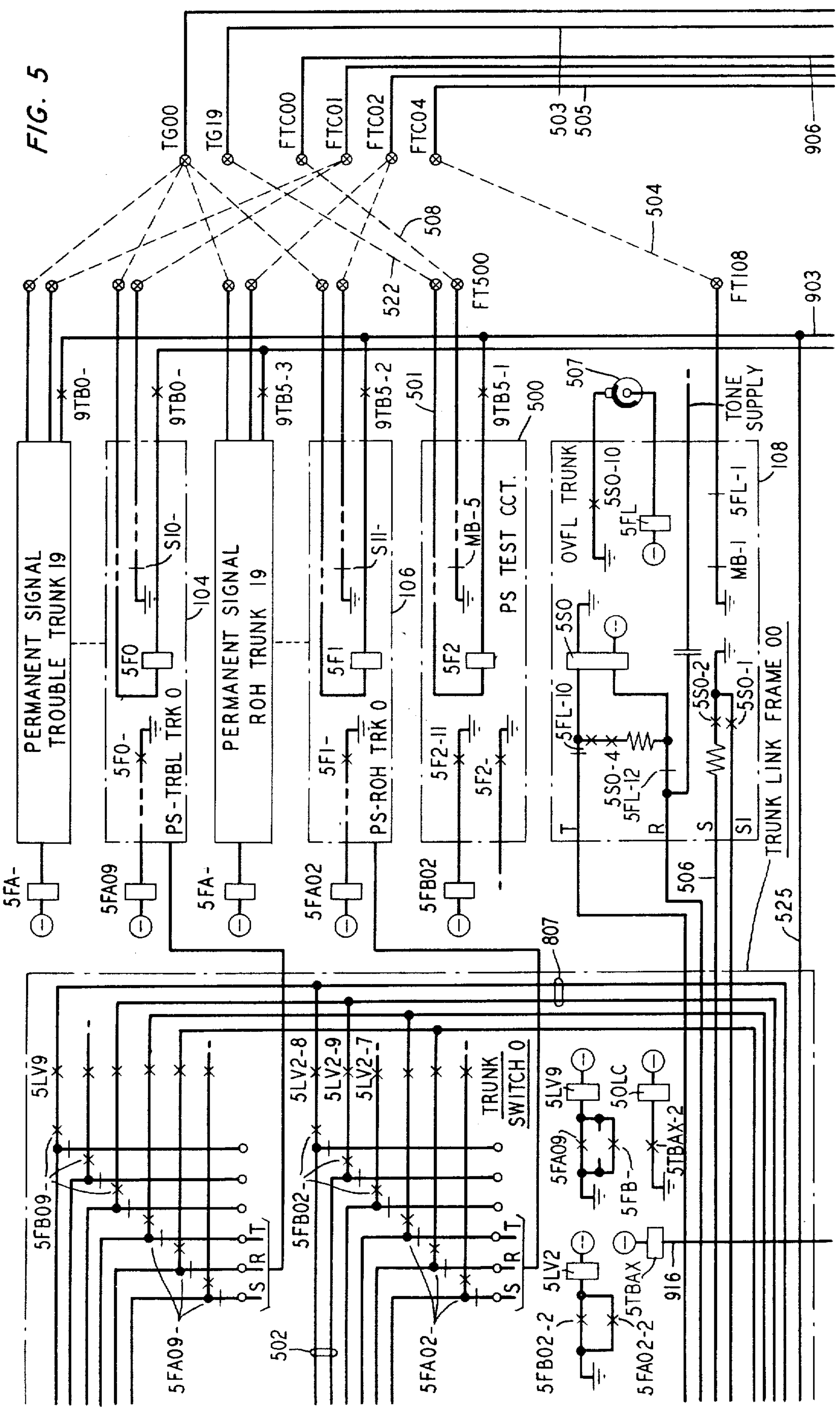
Figure 10:
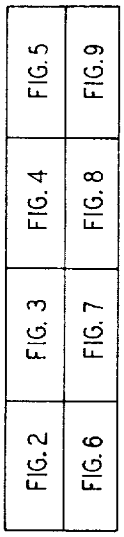

FIGS. 2–10 when arranged according to FIG. 10 depict in more detail, portions of the same telephone system disclosed in the block diagram of FIG. 1. More specifically, FIG. 2 shows a line switch and a line junctor switch on a line link frame. FIG. 3 shows a trunk junctor switch, FIG. 4 shows a trunk switch and FIG. 5 shows a plurality of conventional trunk circuits and an overflow trunk. A portion of the marker circuit is shown in FIGS. 6 through 9 with the channel test circuitry shown in FIG. 6, the continuity and ground test circuitry shown in FIG. 8, the trunk busy test circuitry shown in FIG. 9 and other control logic shown in FIG. 7.

To illustrate the operation of the arrangement let it be assumed that a permanent signal condition has been detected on the line serving station 101 in FIG. 2. As mentioned above, a permanent signal is recognized when a line requests dial tone and no directory number digits representing a called station are received at the switching office within a prescribed interval. This operation is described in more detail in the aforementioned Busch patent and will only be described briefly herein. When a customer goes off-hook or certain trouble conditions occur on his line, a line relay such as 2LO4 operates requesting a connection to a dial tone register. A marker recognizing this service-request signal connects a calling line to a dial tone originating register such as register 105, which is located on the trunk link frame as shown in FIG. 1. This connection is made by operating the appropriate select-and-hold magnets on the line and trunk link frames to interconnect a line link, a junctor and a trunk link between the calling line termination and the orginating register termination at each end of the network.

The dial tone originating register contains timing circuitry which is actuated in the event no dialing information is received from the calling station within a prescribed interval. When the originating register timer is actuated it completes an operating path for operating relay PS (not shown) in the register. The originating register bids for service by the marker and after being connected to the marker the register indicates to the marker that the class of call is a permanent signal. This is accomplished by completing an operating path for relay 7PST through contacts PS-3 in that portion of originating register 105 shown in FIG. 7.

When the marker first responds to a service request it prepares itself for operation by operating several relays such as LLC-, CKG- and TLC-. These relays and their operating circuits have not been shown to simplify the drawing, however, this is more fully described in the aforementioned Busch patent.

Having received an indication that the call is a permanent signal the marker is now ready to operate a "permanent signal test" route relay to permit the marker to connect to the calling line to ascertain the nature of the permanent signal condition. The marker will perform certain tests to determine whether the permanent signal was caused by the customer inadvertently leaving his receiver off-hook or by a trouble condition on the line.

Figure 7:
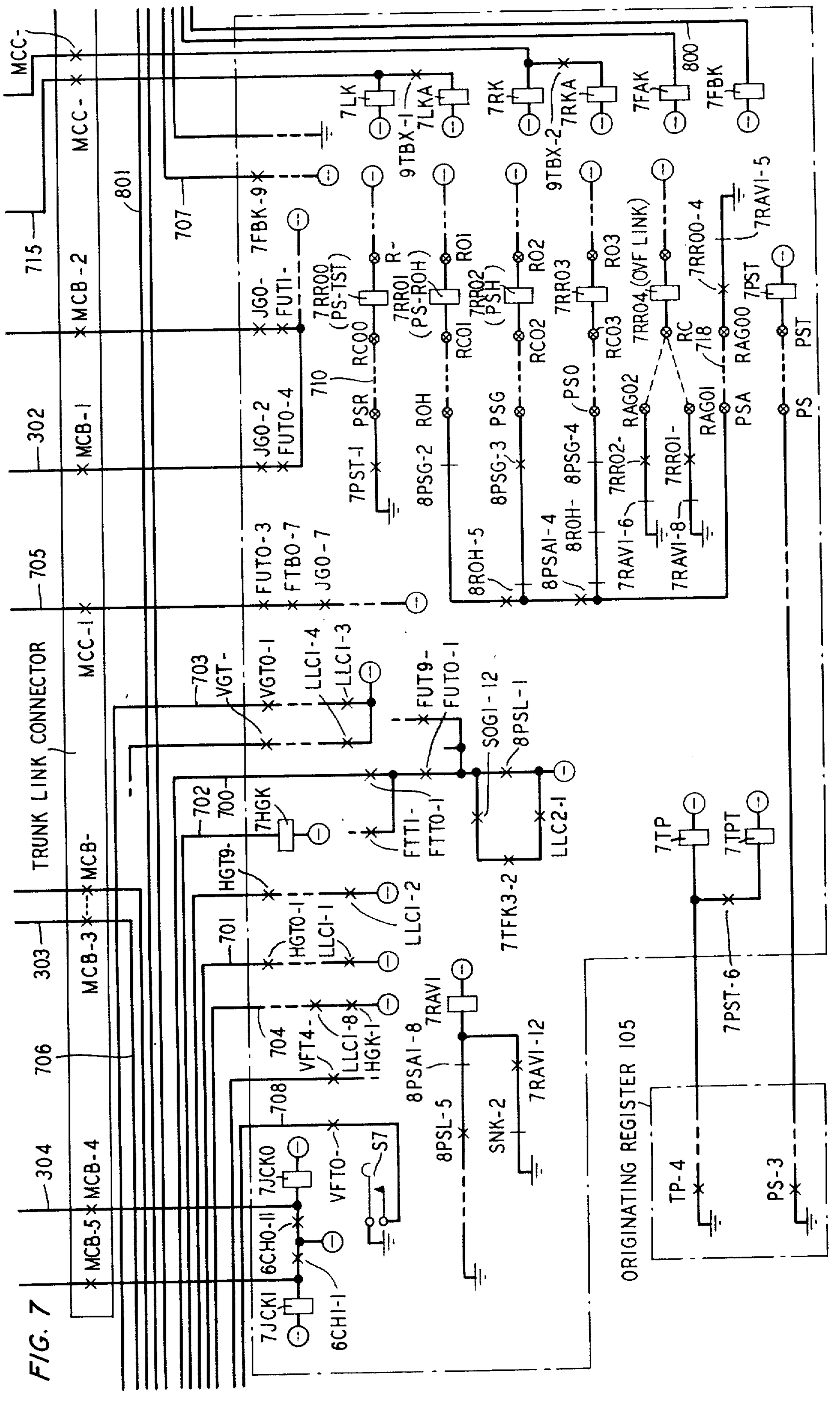

At its contacts 7PST-1 in FIG. 7, relay 7PST extends ground over cross connection 710 and through the winding of route relay 7RROO to battery to operate route relay 7RROO and prepare the marker for trunk selection.

Associated with each route relay is a frame connector relay (FC-) which permits the marker to ascertain which trunk link frames have idle trunks in the selected route. When route relay 7RROO operates, it operates relay FCOO (not shown) and relay FCOO closes its contacts FCOO-1 in FIG. 9 to complete a path for operating relay 9FTC indicating that the permanent signal test circuit is idle. This circuit can be traced from battery through the winding of relay 9FTC, make contacts FCOO-1, conductor 906 and cross connection 508 to ground on break contacts MB-5 of the make busy switch in permanent signal test circuit 500. Relay 9FTC, in operating, informs the marker that there is at least one permanent signal test appearance idle in the office and what trunk link frame it is on.

Trunk selection is accomplished in the system being described by operating a particular trunk block relay and a trunk group relay to define the group of trunks associated with the route relay that has been selected. While an actual trunk group is not used to perform the permanent signal testing, a trunk appearance is used and route relay 7RROO operates trunk block relay 9TB5 and trunk group relay 9TG19 to gain access to this trunk appearance. The operating circuit for relay 9TB5 can be traced from battery through its winding, over cross connection 900 and through make contacts 7RROO-1 to ground through break contacts GS-1 and RCY-3. A similar path can also be traced over cross connection 901 and make contacts 7RROO-2 for trunk group relay 9TG19.

With the trunk block relay 9TB5 and trunk group relay 9TG19 operated a circuit is prepared for operating relay 5F2 in the permanent signal test circuit 500 shown in FIG. 5. This circuit can be traced from battery through resistance RO and the winding of relay 9TT00, over conductor 902, through make contacts MCA-1 in the trunk link connector circuit, over conductor 903 to FIG. 5, through make contacts 9TB5-1 and the winding of relay 5F2, back over conductor 501 and cross connection 522 to punching TG19, over conductor 503 to FIG. 9 and through make contacts MCA-40 and 9TG19-1 to ground at contacts CKG4-1. Relay 9TTOO operates over this circuit to inform the marker that the permanent signal test appearance is idle. However, due to the high resistance RO, relay 5F2 does not operate at this time.

The marker is equipped with a sequence circuit represented by the block diagram 904 and the sequence circuit changes the order of selection of various circuits such as trunks to spread the traffic more evenly over the trunk group. In the case of permanent signal testing a minimum number of permanent signal test circuits need be provided since the marker will only occupy the circuit for a fraction of a second while tests are being made. Accordingly, let it be assumed that sequence circuit 904 will connect low resistance battery to conductor 905 at the winding of relay 9TTOO and over the previously traced path to operate relay 5F2 in the permanent signal test circuit 500. Relay 5F2 completes an obvious circuit in FIG. 5 for operating relay 5FB02. At its make contacts 5FBO2-1 in FIG. 4 relay 5FBO2 extends ground over conductor 400 to FIG. 8, through make contacts MCB-3 in the trunk link connector, over conductor 800 and through the winding of relay 7FBK in the marker thereby operating that relay. Relay 7FBK indicates to the marker that an FB- relay associated with a trunk has been operated on the trunk link frame.

When the originating register 105 siezed the marker indicating that the line serving station 101 had a permanent signal condition, the originating register also informed the marker of the calling line identification. This identification is the location of the line in terms of the line link frame, and the horizontal group, vertical group and vertical file on the line link frame.

Line link frame LLFOO in FIG. 2 is siezed by extending battery from the marker in FIG. 7, through make contacts LLC2-1, TFK3-2 and SOG1-12, through make contacts of the relays designating line link frame OO, namely make contacts FUTO-1 and FTTO-1 and over start lead 700 to line link connector LLC associated with line link frame OO. When line link connector LLC is actuated a plurality of multicontact relays MCA1, MCA2, MCB are operated to extend a plurality of leads and test conductors between the marker and line link frame LLFOO. The marker can now proceed to actuate the various components on the line link frame to establish a connection to station 101.

It will be assumed that line 200 serving station 101 is connected to the line equipment in horizontal group O, vertical group O and vertical file 4 on line link frame LLFOO. Relays HGTO, VGTO and VFT4 in the marker are operated registering the calling line location information from the originating register but the operating circuits for these relays have not been shown to simplify the drawing. At its make contacts HGTO-1 in FIG. 7, relay HGTO extends battery from make contacts LLC1-1 over conductor 701 to FIG. 6, through make contacts MCA1-2, over conductor 201 and through the winding of horizontal group relay 2HGO to operate relay 2HGO. In operating, relay 2HGO transmits ground back over conductor 202, through make contacts MCA1-4, over conductor 702 to operate relay 7HGK informing the marker that the horizontal group relay on the line link frame has been operated.

At its make contacts VGTO-1 in FIG. 7 relay VGTO extends battery from make contacts LLC1-3, over conductor 703, through make contacts MCA1-5, over conductor 203 and through the winding of relay 2VGBO to ground thereby operating vertical group relay 2VGBO.

The operation of one vertical group relay (2VGBO) and one horizontal group relay (2HGO) on the line link frame will identify the line group of five lines within which the calling line is located. The circuit for operating line group relay 2LGO can be traced from ground through its winding through make contacts 2VGBO-1, over conductor 204, through make contacts MCA1-1, over conductor 704, through marker equipment not shown and through make contacts LLC1-8 and HGK-1 to battery.

Having obtained access to the permanent signal test circuit appearance on trunk link frame TLFOO via the trunk link connector TLC and having obtained access to the line appearance on line link frame LLFOO via the line link connector LLC, the marker can now select an idle network path or channel by which the calling line is connected to the permanent signal test circuit. In the selection of such a channel the marker performs the following functions: selects the ten line links by which the calling line may be extended; selects ten trunk links having access to the permanent signal test circuit appearance; and selects a group of junctors by which the selected line links and the selected trunk links may be interconnected. To determine if a particular channel through which the calling subscriber is to be interconnected with the permanent signal test circuit is available for use, it is necessary for the marker to test the particular line link, junctor and trunk link associated with the channel for an idle condition. If any one of these elements is busy the entire channel is unavailable.

In this embodiment the marker is equipped to simultaneously test ten separate channels between a particular subscriber and a circuit appearing on the trunk link frame. To do this the marker will test the line link, the junctor and the trunk link associated with each of the channels but before it is possible for the marker to accomplish this testing the marker must ascertain which ten channels should be selected and must then determine the elements associated with these ten channels.

The group of line links associated with the ten channels to be tested is determined by the location of the calling subscriber line namely the ten line links which terminate in the same horizontal group switch on the line link frame of the calling line. When horizontal group relay 2HGO was operated test circuits were extended to the marker for each of the line links to be tested. The test circuit for line link O may be traced from the sleeve conductor 105 of line link O, over conductor 206, through make contacts 2HGO-2 and MCA2-1, through break contacts LL4-1 or LL7-1 and through the winding of test line link relay 6TTLO to battery. Similar test circuits are extended for the other nine line links but only the test circuits for line link O and line link 9 have been shown to simplify the drawing. When a line link is busy its sleeve conductor will be marked with ground and the corresponding test line link relay will be operated. In this example let it be assumed that line link O is idle and therefore relay 6TTLO will not operate at this time.

When the trunk link frame is connected to the marker the selection and testing of a subgroup of junctors and trunk links can be initiated. The number of junctors and the subgroups available for selection is determined by the number of line link frames and trunk link frames provided in the particular system as set forth in considerable detail in the aforementioned Busch patent. For the purpose of this disclosure, it will be assumed that junctor group O is available for selection as indicated by the operation of junctor group relay JGO (not shown). With junctor group relay JGO operated a circuit is completed for operating one of the junctor cut-in relays on the trunk link frame. In the example being described, junctor cut-in relay 3JCO will be operated over a circuit including ground through its winding make contacts GO-1 and MCC-1, over conductor 705 and through make contacts FUTO-3, FTBO-7 and JGO-7 and through marker equipment (not shown) to battery. A circuit is also completed for operating left relay 3L indicating that the junctor is terminated on the left-hand trunk junctor switches. Ths circuit includes ground through the winding of relay 3L conductor 302, make contact MCB-1, JGO-2, FUTO-4 and marker equipment not shown, to battery. At its contacts 3L-21 in FIg. 3, relay 3L extends ground over conductor 715 to operate relay 7LK indicating to the marker that left relay 3L has operated.

With a junctor connector relay 3JCO and left relay 3L operated, test circuits for the selected subgroup of junctors are extended to the marker. The test circuit for junctor OOO which is the O junctor in the subgroup connecting trunk link frame TLFOO with line link frame LLFOO may be traced from junctor sleeve conductor 300, over conductor 301, through make contacts 3JCO-11 and 3L-10, over conductor 303, through make contacts MCB-3 and over conductor 706 and through break contacts 6CHO-9 to the winding of test junctor relays 6TJO. Similar test circuits are closed from the sleeve conductors of the other nine junctors in the subgroup identified by relay 3JCO to the windings of other 6TJ- relays of which only relay 6TJ9 is shown. If a particular junctor is busy its sleeve conductor will be marked with ground thereby operating the corresponding 6TJ- relay. In the example being assumed junctor OOO is idle and relay 6TJO does not operate.

To indicate that relay 3JCO has operated, ground from select magnet 3TJSO is extended through make contacts 37CO-1 over conductor 304 through make contacts MCB-4 and through the winding of relay 7JCKO to battery operating relay 7JCKO.

When a permanent signal test circuit 500 was first seized relay 5FBO2 on the trunk link frame was operated as described above. In operating relay 5FBO2 closed its make contacts 5FBO2-2 to complete an obvious operating circuit for level relay 5LV2 which is associated with all circuits appearing on level 2 of the trunk switches on trunk link frame TLFOO. With relay 5FLV2 operated a circuit is completed for operating link connector relay 4LCO on the trunk link frame, this circuit includes ground through the winding of relay 4LCO, make contacts 5FBO2-3 and 5LV2-1 conductor 810, make contacts MCB-4 in the trunk link connector, conductor 802 and marker equipment not shown to battery.

Upon the operation of link connector relay 4LCO circuits are completed for testing the ten trunk links between the left trunk junctor switch O and the left trunk switch O on trunk link frame TLFOO. The circuit for trunk link O extends from its sleeve conductor 401, through make contacts 4LCO-14 and 3LC-12, over conductor 402 to FIG. 8, through make contacts MCB-20 in the trunk link connector, over conductor 801 through FIG. 7 to FIG. 6, through break contacts 6CHO-1 and through the winding of test trunk link relay 6TTLO to battery. Similar circuits are completed for the other nine trunk links in the group, however, only the circuits for trunk link 0 and 9 have been shown. If a trunk link is busy on a call its sleeve conductor will be marked with ground to operate the associated test trunk link relay in FIG. 4. Let it be assumed however, that trunk link 0 is idle and relay 6TTL0 does not operate.

When relay 4LCO operated on the trunk link frame it also completed a circuit from ground through its contacts 4LCO-2 in FIG. 4, over conductor 403, through make contacts MCB-60 and through the winding of relay 8LCK to battery thereby operating relay 8LCK indicating to the marker that an LC-relay has been operated on the trunk link frame.

Test circuits have now been closed for the line links, the junctors and the trunk links, for all channels in the subgroup by which the calling line may be connected to the permanent signal test circuit appearance. Before proceeding with the selection of an idle channel the marker ascertains that the previously described check relays have been operated in addition to other check relays which have not been shown in the drawing. This circuit includes battery through the winding of total check relay 6TK through make contacts 7FBK-4, break contacts 7FAK-4, through make contacts 7LK-3 and break contacts 7RK-3, through make contacts 7HGK-5 and 8LCK-1, through marker equipment not shown to ground on contacts 7JCKO-3. Relay 6TK, in operating, closes ground through its make contacts 6TK-3, through timer 600 and through the winding of channel timing relay 6CHT to battery. Timer 600 delays the operation of relay 6CHT allowing time for any previously operated line link test relays, junctor test relays and trunk link test relays to release. When relay 6CHT operates after a short delay a circuit is prepared for operating one of the channel relays 6CH- in the channel test and selection circuit of FIG. 6. Ground is extended from contacts LLC1-6, through marker equipment not shown, through break contacts 6FMP-3 and through the break contacts of each of the 6CHO through 6CH9 relays, through make contacts 6CHT-1, through marker equipment not shown, through break contacts TCHO-1, through break contacts 6TLLO-151 6TTLO-1 and 6TJO-1 and through the winding of relay 6TLLO-1, over conductor 601 and through the winding of relay 6CHA to battery. Since it has been assumed that the line link, junctor and the trunk link for channel 0 are idle, relays 6TLLO, 6TTLO and 6TJO are normal completing the operating path for channel select relay 6CHO. If any one of these components had been busy thereby operating its associated test relay the ground over the previously traced path would be extended to one of the higher numbered channel select relays.

The marker is now ready to actuate the select and hold magnets on the various switches, to interconnect the calling subscriber at station 101 with the permanent signal test circuit on trunk link frame TLFOO. At its contacts 6CHO-1 in FIG. 6, channel select relay 6CHO extends battery over conductor 602, through make contacts MCA2-4, over conductor 207, through make contacts 2HGO-30 and 2HGO-40 and through the windings of line junctor select magnet 2LJSO and line select magnet 2LSO to ground operating these select magnets. In FIG. 7 contacts 6CHO-11 connect low-resistance battery over the previously traced path to operate trunk junctor select magnet 3TJSO.

As mentioned above, the trunk switch is a six-wire switch and, through the use of the well-known level switching technique, two trunks are accommodated on each of the levels 2 through 9. This requires that two select magnets be operated to gain access to any trunk appearance. In the example being described select magnets 4B and 4TS20 are actuated over a circuit including battery through marker equipment, not shown, in FIG. 7, through make contacts 7FBK-9, over conductor 707 to FIG. 8, through contacts MCB-20, over conductor 404 to FIG. 4 and through make contacts 5LV2-4 and 5FBO2-12 and through the winding of select magnet 4B to ground operating select magnet 4B. The same ground is extended through make contacts 5LV2-5 and 5FBO2-11, through the winding of select magnet 4TS20 and back over conductor 405, through make contacts 4LCO-3 to ground in the marker thereby operating select magnet 4TS20.

Figure 6:
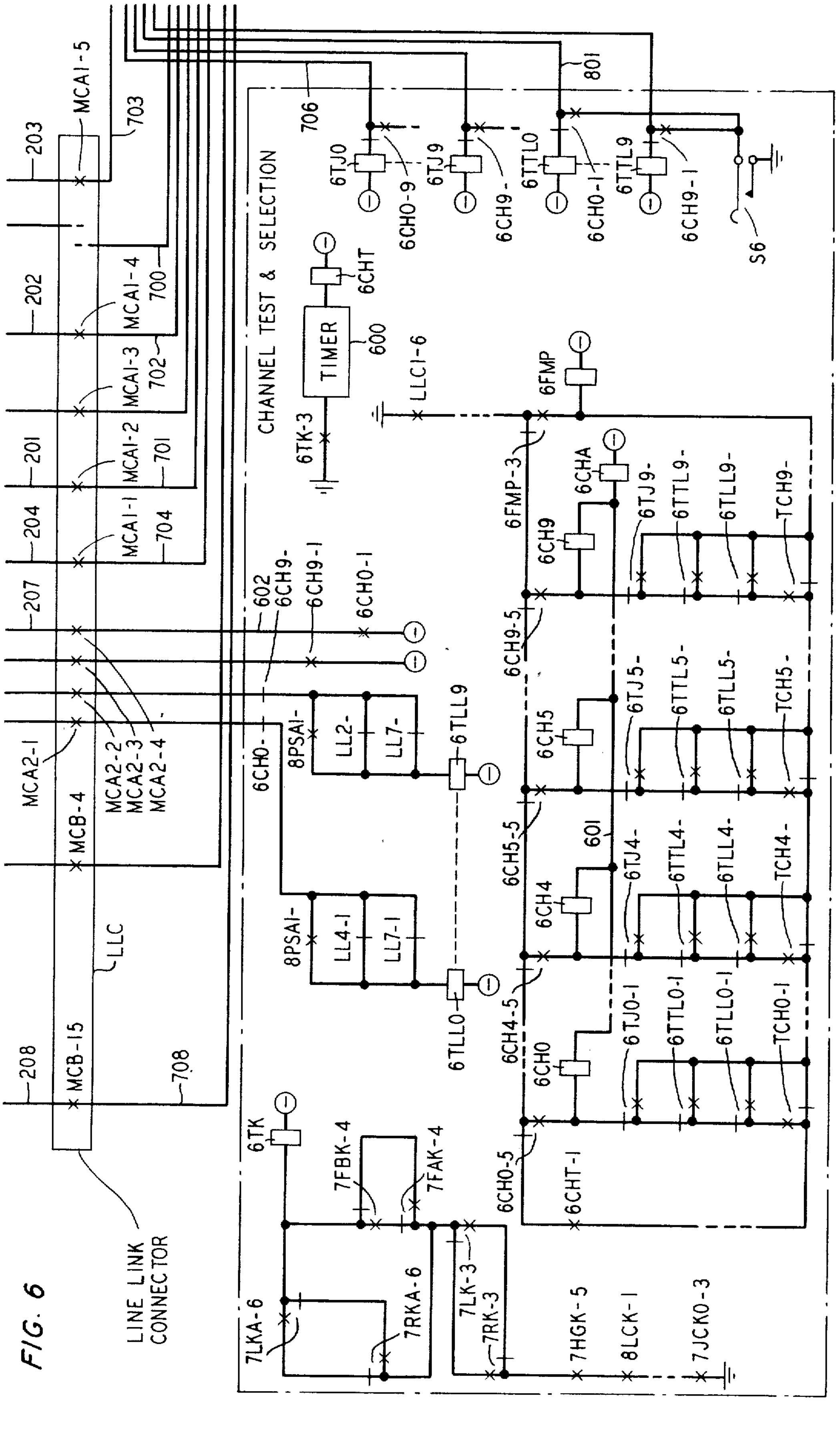

The operation of the 6CHA relay in FIG. 6 starts a hold magnet timing circuit (not shown) to allow time for the operation of all select magnets before any hold magnets are operated. Subsequent to the operation of the hold magnet timing circuit, a ground for operating the hold magnets is connected to the sleeve conductor of the channel by relays in the marker. These relays and the description of this operation is shown in more detail in aforementioned Busch patent and this circuitry will be represented herein by switch S6 in FIG. 6. Assuming that switch S6 is closed due to this marker action, ground is extended through make contacts 6CHO-1, over conductor 801 and the previously traced path to sleeve conductor 401 of trunk link O. Ground on the sleeve conductor 401 is extended through the winding of trunk hold magnet 4THO which operates at this time. This ground is also extended over the sleeve conductor of trunk link O to the trunk junctor switch in FIG. 3 to operate trunk junctor hold magnet 3TJHO. Once trunk junctor hold magnet 3TJHO is actuated, cross points 305 are closed to extend the same ground over sleeve conductor 300 to FIG. 2 to operate line junctor hold magnet 2LJHO thereby closing cross points 228. The tip ring and sleeve conductors have now been extended from the trunk appearance of permanent signal test circuit 500 to the line switch in which the calling line appears.

As described more fully in the aforementioned Busch patent, the marker now checks that all of the above cross points are closed on the line link frame and trunk link frames and proceeds to test for false crosses and grounds on the tip and ring conductors of the selected channel. If there is no false ground potential on the ring conductor, no false battery potential on the tip conductor and no false cross between ring and tip conductors, a successful false cross and ground test will have been made and the marker will operate to close a circuit for operating the line hold magnet associated with line 200. In the Busch patent these operations were performed by relays but to simplify the disclosure these relays will be represented by switch S7 in FIG. 7. It is assumed that switch S7 is operated so that its contact is closed to extend ground over conductor 708 to FIG. 6, through contacts MCB-15, over conductor 208 to FIG. 2, through make contacts 2LGO-6 and through the winding of line hold magnet 2LHOO thereby operating the line hold magnet.

Figure 8:
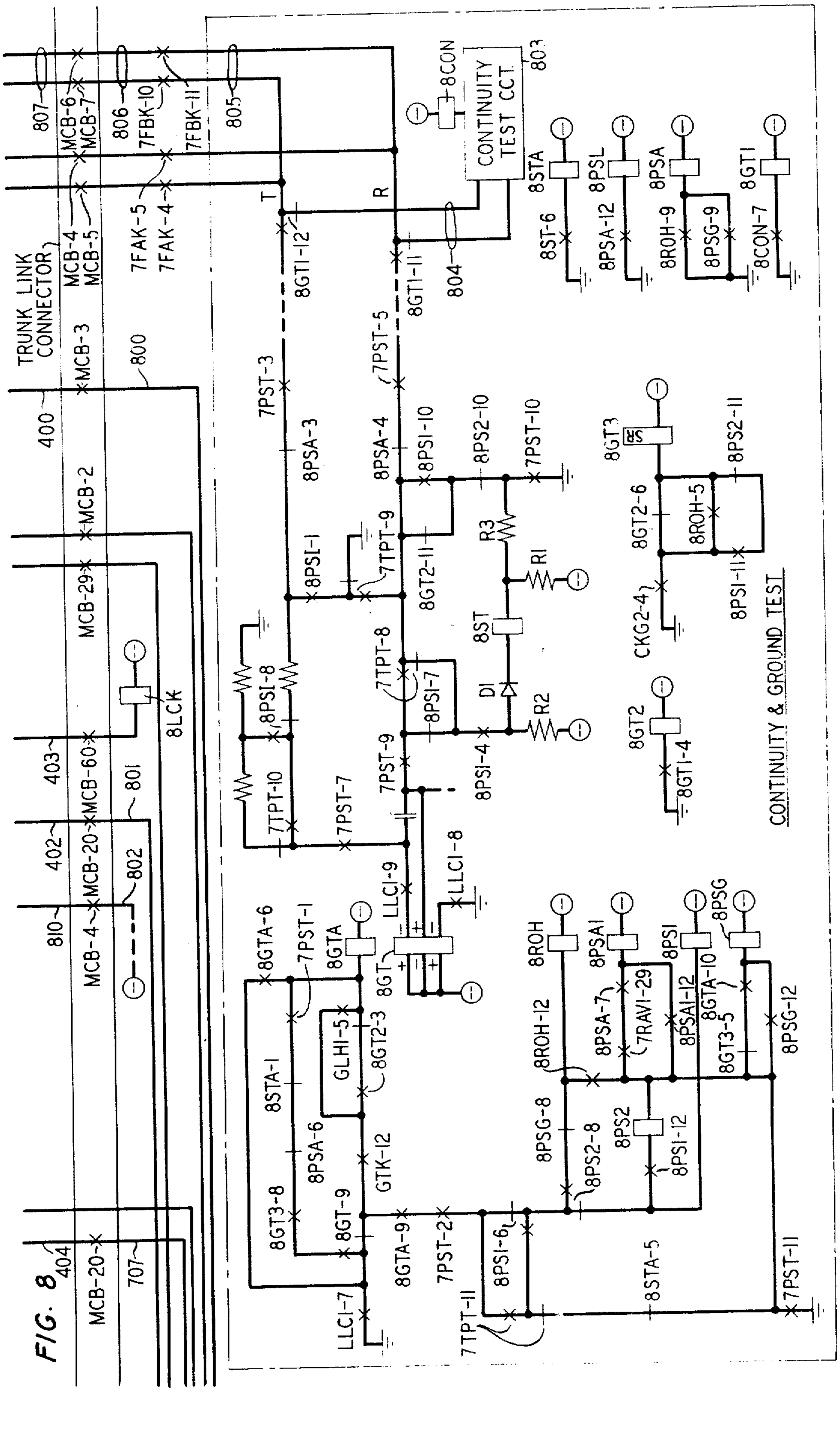
Figure 9:
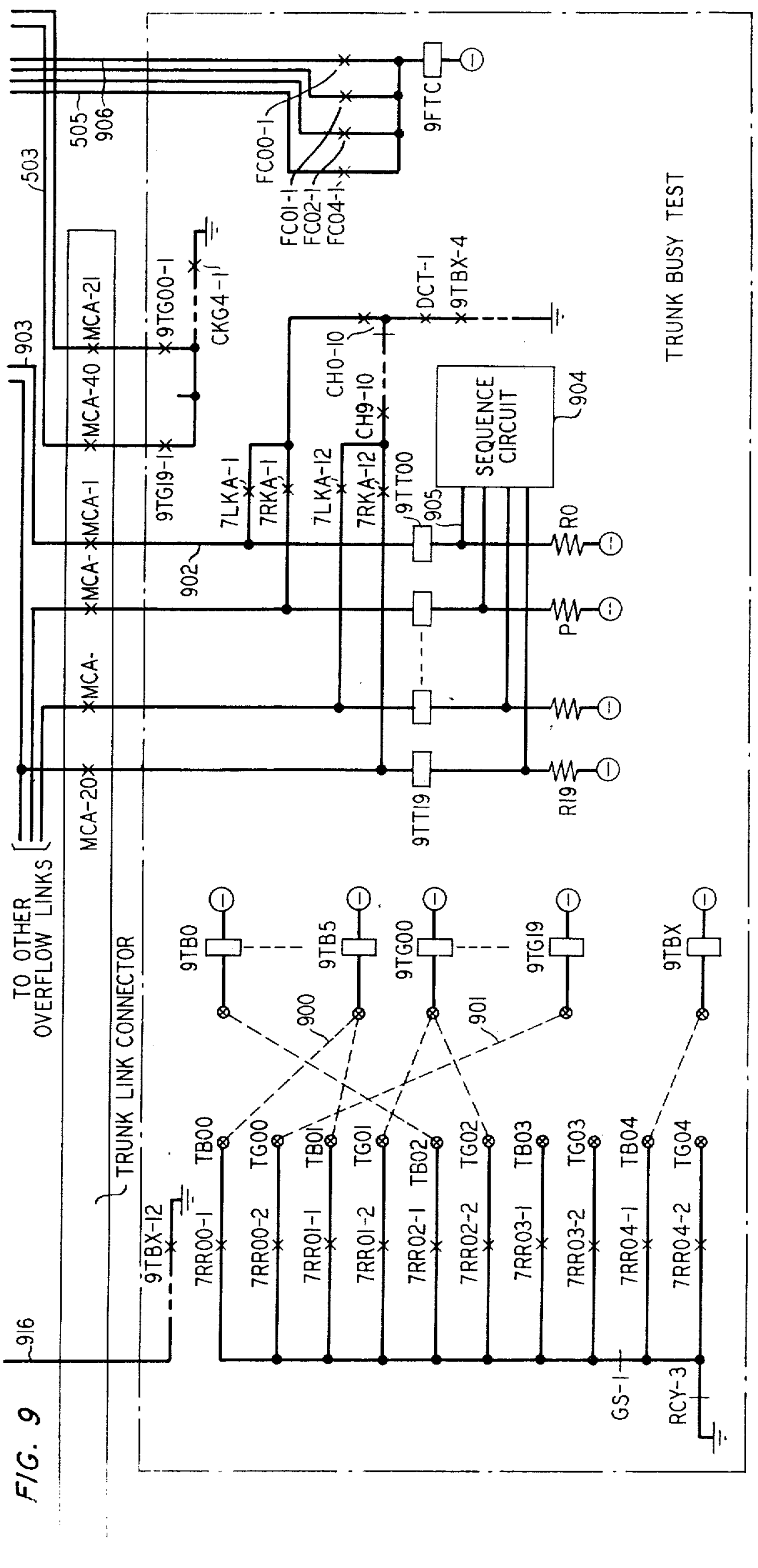

With line hold magnet operated the marker can now perform various tests to determine the condition of the channel and the calling line. As a first step, continuity test circuit 803 in FIG. 8 is connected over the channel tip and ring conductors to the calling line. This circuit includes continuity test circuit 803, conductors 804, break contacts 8GT1-11 and 8GT1-12, conductors 805, make contacts 7FBK-10 and 7FBK-11, conductors 806, make contacts MCB-6 and MCB-7, conductors 806 to FIG. 5, make contacts 5LV2-8 and 5LV2-9, conductors 502 to FIG. 4, through crosspoints 406 and 407, over conductors 408 in trunk link O to FIG. 3, through crosspoints 305 and over conductors 306 in junctor OOO through crosspoints 228 and over conductors 209 in line link O through crosspoints 210 and over line 200 to station 101. The continuity test circuit tests for the presence of a continuous path from the appearance of the permanent signal test circuit on the trunk link frame to the station. If the test is satisfactory, relay 8CON operates to complete an obvious path for operating relay 8GT1 to prepare the marker for making a ground test.

The marker is now ready to perform ground tests on the channel and line. When the marker was initially seized and a permanent signal test was indicated by the operation of relay 7PST, ground test relay 8GT operated. The circuit for operating this relay includes battery through its middle winding, make contacts 7PST-9, break contacts 8PS1-7, 7TPT-8, 8GT2-11 and 8PS2-10 and make contacts 7PST-10 to ground. When relay 8GT1 operated, as a result of a successful continuity test, it operated relay 8GT2 to start the ground test and contacts 8GT2-11 open the original operating circuit for relay 8GT. Contacts 8GT1-11 and 8GT1-12 transfer the tip and ring conductors 805 from continuity test circuit 803 to the ground test circuit. With relay 7TPT normal the ring conductor is connected to the middle winding of relay 8GT. Relay 8GT2 also completes a path for operating relay 8GTA. This path includes battery through the winding of relay 8GTA, break contacts GLH1-5, make contacts 8GT2-3 and GTK-12, break contacts 8GT-9 to ground on make contacts LLC1-17.

If there is no ground present on the ring conductor of the channel or the calling line, relay 8GT releases and completes a circuit for operating relay 8PS1. This circuit includes battery through the winding of relay 8PS1, break contacts 8PS2-8 and 8PS1-6, make contacts 7PST-2 and 8GTA-9, break contacts 8GT-9 to ground on make contacts LLC1-7.

Relay 8PS1 provides a path for operating relay 8ST. This path can be traced from battery through resistance R1 in FIG. 8, through the winding of relay 8ST and diode D1, through make contacts 8PS1-4, break contacts 7TPT-8, 8GT2-11 and 8PS2-10 and through make contacts 7PST-10 to ground. Relay 8ST provides an obvious operating circuit for relay 8STA in FIG. 8. At its break contacts 8STA-5, relay 8STA removes the shunt from around the winding of relay 8PS2 and relay 8PS2 operates over a circuit including battery through the winding of relay 8PS1, make contacts 8PS1-12, the winding of relay 8PS2 to ground on make contacts 7PST-11.

With relay 8PS2, operated the marker tests the channel and calling line for a short circuit across the tip and ring conductors to ascertain if the permanent signal condition was caused by a trouble on the line or the receiver being inadvertently left off-hook at the station. The short circuit test is made by connecting the winding of relay 8ST to the channel and the line over a circuit which will hold relay 8ST operated if there is a low resistance short circuit across the tip and ring conductors but will permit relay 8ST to release if there is a high resistance short circuit caused by a receiver off-hook. This test circuit includes battery through resistance R1, the winding of relay 8ST, diode D1, make contacts 8PS1-4, break contacts 7TPT-8 and 8PSA-4, make contacts 7PST-5 and 8GT1-11 and over the previously traced ring conductor of the channel and line to station 101. Since it has been assumed that station 101 has its receiver off-hook the battery will be returned over the tip conductor as previously traced to make contacts 8GT1-12 in FIG. 8, through make contacts 7PST-3, break contacts 8PSA-3, make contacts 8PS1-1 to ground on break contacts 7TPT-9. With a receiver off-hook the short circuit across the tip and ring conductors of the line of a higher resistance than a trouble condition such as a short circuit across the tip and ring conductors of the channel in the central office. Under a receiver off-hook condition relay 8ST will release causing relay 8STA to release. A circuit is now completed for operating relay 8ROH. This circuit includes battery through the winding of relay 8ROH, break contacts 8PSG-8, make contacts 8PS2-8 and 8PS1-6, break contacts 7TPT-11 and 8STA-5 to ground at make contacts 7PST-11. At its make contacts 8ROH-9 in FIG. 8, relay 8ROH completes an obvious circuit for operating relay 8PSA and relay 8PSA operates relay 8PSL via contacts 8PSA-12. At its contacts 8PSA-3 and 8PSA-4, relay 8PSA disconnects the ground test relay 8GT and the short circuit test relay 8ST from the tip and ring conductors, thus completing the testing of the calling line to ascertain the nature of the permanent signal condition.

The marker is arranged to advance to different trunk routes under certain circumstances such as when all trunks in a first choice route are busy. In the present example, the route advance feature of the marker will be used to release the connection between the calling station and permanent signal test circuit 500 and establish a new connection from the station to one of the permanent signal trunks based on the type of permanent signal condition. In the example being described the permanent signal was caused by a receiver off-hook at station 101 so a connection can be established from that station to permanent signal ROH trunk 106.

When relay 8PSL operated it closed its make contacts 8PSL-5 in FIG. 7 to extend ground through break contacts 8PSA1-8 and the winding of relay 7RAV1 to battery to operate relay 7RAV1. The operation of relay 7RAV1 initiates the route advance function as described in more detail in the aforementioned Busch patent. During a route advance the marker releases the permanent signal test circuit 500 and the trunk link and junctor of the selected channel. In addition, all of the information derived from the route relay 7RROO such as the trunk block and trunk group information is also released. The marker still retains control of the line link used so that this link may be reused to connect the calling line with the newly selected trunk.

When route advance relay 7RAV1 operated it completed a circuit for operating relay 8PSA1. This circuit includes battery through the winding of relay 8PSA1 and make contacts 8PSA-7, 7RAV1-29 and 7PST-11 to ground. Relay 8PSA1, in operating, opens the operating circuit for relay 7RAV1, however relay 7RAV1 is locked over a circuit including contacts SNK-2.

Relay SNK, whose winding is not shown, operates when various items of equipment originally selected by route relay 7RROO have been released and the marker is ready to select another route relay. Relay SNK, in operating, releases relay 7RAV1. When relay 7RAV1 releases it closes its break contacts 7RAV1-5 in FIG. 7 to extend ground through make contacts 7RROO-4 over cross-connection 718 to punching PSA through make contacts 8PSA1-4 and 8ROH-5 through break contacts 8PSG-2 and through the winding of relay 7RRO1 to battery. Relay 7RRO1 operates and prepares the marker for selecting a permanent signal trunk which is used for permanent signals which are caused by a receiver off-hook condition. The trunk selection process is similar to that described above and in the aforementioned Busch patent and once having selected a trunk, such as trunk 106, the marker establishes a channel connection between the calling line and the trunk.

In the example described, the permanent signal condition was caused by the receiver being off-hook at station 101 and the call was directed to the trunk group selected by route relay 7RRO1. It will be recalled from the above description that the short circuit test relay 8ST and ground test relay 8GT were both required to release to permit the operation of relay 8ROH. If either relay 8GT or 8ST fails to release, a trouble condition is indicated and operation of relay 8ROH is blocked. When relay 8GT2 operated at the start of the ground test it opened the operating path for slow release relay 8GT3 and relay 8GT3 begins to release. If relay 8ROH does not operate to prevent the release of relay 8GT3, the release of relay 8GT3 completes a path from ground on make contacts 7PST-11, through its own break contacts 8GT3-5, make contacts 8GTA-10 and through the winding of relay 8PSG to battery. Relay 8PSG operates and at its make contacts 8PSG-3 in FIG. 7, it prepares a path for operating route relay 7RRO2 which is associated with the permanent signal trouble trunks such as trunk 104. Under these circumstances, when the marker route advances, the calling line will be connected to a permanent signal trouble trunk which is generally accessible from a local test desk for testing the trouble conditions on the line.

The use of relay 8GT and relay 8ST as described is modified when tip party test relay 7TPT is operated. Operation of tip party relay 7TP by the originating register 105 indicates a grounded two party line. In this case, the operation of relay 7PST closes ground from the originating register through contacts 7PST-6 to operate relay 7TPT. With relay 7TPT operated, relay 8GT is used twice, and relay 8ST is not used. When relay 8GT1 operates with relay 7TPT operated, the tip and ring conductors 805 are transferred from the continuity test circuit 803 to the upper and middle windings respectively of relay 8GT. If the ground on the tip and ring conductors is balanced, which is a valid condition for a tip party receiver off-hook, relay 8GT will release when relay 8GT2 operates and removes the operating ground to the middle winding of relay 8GT. The release of relay 8GT operates relay 8PS1 as previously described. However, operation of relay 8PS1 with relay 7TPT operated recloses a ground through contacts 8PS1-10 to the middle winding of relay 8GT to reoperate relay 8GT. Relay 8PS1 also transfers the tip conductor of 805 from the upper winding of relay 8GT through contact 8PS1-8 to the middle winding of relay 8GT through contact 8PS1-1. Thus, both tip and ring conductors 805 are connected to the middle winding. When relay 8GT reoperates, relay 8PS2 operates in series with relay 8PS1 as previously described. Operation of relay 8PS2 removes the operating ground to relay 8GT through contacts 8PS2-10 and relay 8GT will release if a low resistance ground is not present on the tip and ring conductors. Release of relay 8GT closes ground through contacts 7TPT-11 to operate relay 8ROH. Subsequent action is the same as previously described for a receiver off-hook condition. If relay 8GT fails to release on either the first or second usage, relay 8ROH will not operate and allow relay 8GT3 to release to operate relay 8PSG as previously described for a permanent signal trouble condition.

It will be noted that for each of the permanent signal calls described thus far a connection was established from a line termination on the line link frame to a trunk termination on a trunk link frame using a channel comprising a line link, a junctor and a trunk link. In the event of a large number of permanent signals caused by a cable failure or the like, the number of permanent signals may exceed the number of available trunks.

In accordance with a feature of the invention certain of the trunk links on the trunk link frame are equipped with overflow trunk circuits such as 108 in FIG. 5. Although the overflow trunks do not occupy the conventional trunk appearance on the trunk link frame, the overflow trunk circuits are selected by operating a route relay. The route relay assigned to the overflow trunk circuits is route relay 7RRO4 and in this disclosure the overflow trunks are to be selected on a route advance if all permanent signal receiver off-hook or permanent signal trouble trunks are found busy. Of course it will be realized that the overflow trunk route relay could be operated initially for all permanent signals or only certain types of permanent signals depending on the needs of a particular system.

Let it be assumed that the marker has route advanced from a call which found all permanent signal trouble trunks busy and upon the release of relay 7RAV1, route relay 7RRO4 operates in FIG. 7. Route relay 7RRO4 operates frame connector relay PCO4 (not shown) to extend test leads from all idle overflow trunk circuits to the marker. The test lead for overflow trunk 108 can be traced from ground through break contacts MB-1 and 5FL-1 to punching FT108, over cross-connection 504 to punching FTCO4, over conductor 505 to FIG. 9, through make contacts FCO4-1 and through the winding of relay 9FTC to battery. Relay 9FTC operates indicating that there is at least one idle overflow trunk circuit on trunk link frame TLFOO and the marker proceeds to seize the trunk link frame in a conventional manner as more fully described in the aforementioned Busch patent.

When the marker seizes trunk link frame TLFOO it operates relay 3L as described above, indicating that the junctors serving the line link frame of the calling line appear on the left trunk junctor switches.

At its make contacts 7RRO4-1 route relay 7RRO4 extends ground from break contacts RCY-3 through the winding of relay 9TBX to operate relay 9TBX. With relay 9TBX operated, it closes its contacts 9TBX-1 in FIG. 7 to provide an obvious path for operating left check auxiliary relay 7LKA. Relay 9TBX also extends ground through its make contacts 9TBX-12 in FIG. 9, through equipment not shown, over conductor 916 to FIG. 5 and through the winding of relay 5TBAX on the trunk link frame thereby operating relay 5TBAX. At its make contacts 5TBAX-2 in FIG. 5 relay 5TBAX operates relay 5OLC.

Relay 5OLC is similar to link connector relay 4LC in that it extends a plurality of test leads from the channel test circuitry in the marker to the sleeve conductors of the trunk links on a selected trunk link frame. With relay 5OLC, however, test leads are extended to the sleeve conductor of only those trunk links that have overflow trunk circuits connected to them. Thus, for example, the sleeve conductor 506 of overflow trunk circuit 108 is connected through make contacts 5TBAX-4, over conductor 408 through make contacts 5OLC-1 and 3L-12, over conductor 402 and over the previously traced path to the winding of test trunk link relay 6TTLO. Relay 6TTLO operates if the trunk link or the overflow trunk circuit connected thereto is busy as indicated by ground on the sleeve conductor. Let it be assumed that the link and trunk are idle and relay 6TTL does not operate.

In the prior example whenever a trunk circuit which is terminated on a trunk link frame is selected an FA- or FB-relay on the trunk link frame was actuated to indicate the switch and level appearance of the trunk. The FA- or PB- relay actuated a corresponding 7FAK or 7FBK relay in the marker, informing the marker that trunk selection had been accomplished and that the marker could proceed with the selection of an idle channel through the network. When an overflow trunk is to be used, the conventional trunk testing and selection process is bypassed and the marker advances directly to the selection of an idle channel. This is accomplished in the present disclosure by operating the total check relays 6TK in the absence of relays 7FAK and 7FBK being operated.

Relay LCK in the marker operates as soon as overflow link connector relay 5OLC operates and if all other check relays except the 7FAK or 7FBK are operated relay 6TK operates. The circuit for operating relay 6TK includes battery through its winding, through make contacts 7LKA-6 and break contacts 7RKA-6, through make contacts 7LK-3 and break contacts 7RK-3, through make contacts 7HGK-5 and 8LCK-1 through other check relays not shown to ground on make contacts 7JCKO-3.

When relay 6TK operates the marker selects an idle channel through the network as described above and in the aforementioned Busch patent. The marker examines up to ten line links, ten junctors and ten trunk link components in order to find a channel that has all three matching components idle. In this instance the examination of the trunk link also determines if its associated overflow trunk is also idle.

Let it be assumed that trunk link O and its associated overflow trunk circuit 108 are idle so that the marker can select line link O, line junctor O and trunk link O in the manner described with respect to the previous call. To distinguish from the priorly described call, however, the marker does not operate select magnets on the trunk switch of the trunk link frame, but operates relay 4SAO over a path including the winding of relay 4SAO, make contacts 5TBAX-1, conductors 525 and 903, make contacts MCA-1, conductor 902, make contacts 7LKA-1, CHO-10, DCT-1 and 9TBX-4 to ground. Operation of relay 4SAO extends the tip, ring and sleeve conductors over the network from the calling line appearance through make contacts 4SAO-3 and 4SAO-4 to the overflow trunk circuit. Relay 5SO in the overflow link circuit operates from the permanent signal condition on the line. At its make contacts 5SO-1, relay 5SO locks operated relay 4SAO on the trunk link frame through make contacts 4SAO-1 and at its make contacts 5SO-2, relay 5SO extends ground over conductor 506 and through make contacts 4SAO-2 to the sleeve conductor of the channel to maintain the hold magnets operated on the various cross-bar switches of the network.

The overflow trunk circuit 108 connects tone over the connection to the calling line indicating that the line is connected to a permanent signal circuit. Relay 5FL in the overflow link circuit is actuated periodically by interrupter 507 to open the tip and ring conductors toward the calling line thereby permitting certain station equipment to release if the user improperly used the equipment and falsely generated a permanent signal. In addition, relay 5FL holds relay 5SO operated to prevent the overflow link circuit from releasing during this interval and at its break contacts 5FL-1 relay 5FL removes ground from punching FT108 indicating that the overflow link circuit is still busy.

Thus, in accordance with the illustrative embodiment of the invention, a multistage telephone switching network is furnished with permanent signal and tone trunks connected to the end stage of the network and with overflow circuits connected to intermediate links which interconnect the various switching stages. The common control equipment of this system ascertains the nature of the permanent signal condition by connecting the calling line to a dummy trunk appearance and performing several tests on the line. Based on the results of these tests, the common control routes the permanent signal call to one of the permanent signal trunks at the end stage of the network or to an overflow circuit connected to one of the intermediate stages.

It will be understood that the above-described arrangements are merely illustrative of the application and principles of the invention. Numerous other arrangements may be devised by those skilled in the art without departing from the spirit and scope of the invention.

For example, while the arrangement described herein contemplates the connection of overflow circuits to the last intermediate link of the network, the overflow circuits may be connected to any of the other intermediate stage links. Furthermore, the sequence of routing to the various types of permanent signal circuits can be altered depending on the needs of the particular system.

What is claimed is:

1. In a telephone system having a plurality of network switching stages interconnected by links for extending communication paths between said stages, a first group of trunks connected to one of said stages, a second group of trunks connected to said links, trunk test means for ascertaining the availability of trunks in said first group, channel test means for ascertaining the availability of said links, and control means responsive to the unavailability of trunks in said first group for using said channel test means for selecting an idle one of said second group trunks.

2. The system defined in claim 1 further comprising calling lines connectable to said trunks over said network stages and links and means responsive to a permanent signal condition on one of said lines for selecting an idle trunk in one of said groups.

3. In a telephone system including a multistage network having lines connected to a first one of the stages and links interconnecting the stages, a first group of trunks connected to a second one of said stages, a second group of trunks connected to said links, trunk test means for ascertaining the availability of trunks in said first group, channel test means for ascertaining the availability of said links, line test means responsive to a permanent signal on one of said lines for ascertaining whether said permanent signal is caused by a receiver off-hook or a trouble condition on said one line, and control means actuated by said line test means for causing said link and trunk test means to select one of said trunks for connection to said one line.

4. The invention defined in claim 3 wherein said control means comprises means responsive to the unavailability of trunks in said first group for causing said channel test means to ascertain the availability of trunks in said second group.

5. In a telephone system having a first switching stage with lines connected thereto, a last switching stage and communication channels including links interconnecting said switching stages, a first group of trunks connected to said last switching stage, a second group of trunks connected to said links, trunk test means for ascertaining the availability of said first group trunks, channel test means actuated by said trunk test means when a first group trunk is available for selecting an idle channel between a calling one of said lines and said available first group trunk, and control means responsive to the unavailability of a first group trunk for causing said channel test means to select for connection to said calling line an idle one of said channels including an idle one of said second group trunks.

6. The invention defines in claim 5 wherein said first group of trunks comprises a first and second subgroup of trunks, wherein is also provided line test means responsive to a permanent signal on said calling line for ascertaining whether said permanent signal is caused by a receiver off-hook or a trouble condition on said calling line, and wherein said control means comprises means for connecting said calling line to a first subgroup trunk when said permanaent signal is caused by a receiver off-hook and means for connecting said calling line to a second subgroup trunk when said permanent signal is caused by a trouble condition on said calling line.

7. The invention defined in claim 6 wherein said calling line comprises a pair of line conductors having a first potential connected thereto wherein said line test means comprises first detector means connectable to said line conductors for detecting a potential other than said first potential and second detector means connectable to said line conductors for detecting a short circuit between said conductors.

8. The invention defined in claim 7 wherein said second detector comprises means for determining a first resistance short circuit representing a receiver off-hook and means for detecting a second resistance short circuit having a lower resistance than said first resistance short circuit and representing a trouble condition on said line conductors.

9. In a telephone system having a first switching stage with lines connected thereto, a last switching stage, and a plurality of links for establishing communication paths between said stages, a first group of trunks connected to said last switching stage, a second group of trunks connected to particular ones of said links, means effective when an idle one of said first group trunks is selected for connection to a calling one of said lines for generating a trunk select signal, channel test means responsive to said trunk select signal for establishing a path from said one calling line over one of said links to said last switching stage, and control means effective when all of said first group trunks are busy for causing said channel test means to establish a path over a particular one of said links to one of said second group trunks exclusive of said last switching stage.

10. The invention defined in claim 9 wherein said channel test means comprises a plurality of detectors selectively connectable to said links to ascertain the busy-idle status of each of said links and wherein said control means comprises means for selectively connecting said detectors only to those particular links having a second group trunk connected thereto.

* * * * *